(12) United States Patent
Grandhye et al.

(10) Patent No.: US 11,716,278 B1
(45) Date of Patent: Aug. 1, 2023

(54) SYSTEM AND METHOD FOR DETERMINING THE SHORTEST DATA TRANSFER PATH IN DATA COMMUNICATION

(71) Applicant: Bank of America Corporation, Charlotte, NC (US)

(72) Inventors: Nagendra B. Grandhye, Hyderabad (IN); Venugopala Rao Randhi, Hyderabad (IN); Vijaya Kumar Vegulla, Hyderabad (IN); Rama Venkata S. Kavali, Frisco, TX (US); Damodarrao Thakkalapelli, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 17 days.

(21) Appl. No.: 17/583,460

(22) Filed: Jan. 25, 2022

(51) Int. Cl.
H04L 45/12 (2022.01)
H04L 45/122 (2022.01)
H04L 45/00 (2022.01)

(52) U.S. Cl.
CPC ............ *H04L 45/122* (2013.01); *H04L 45/20* (2013.01); *H04L 45/22* (2013.01)

(58) Field of Classification Search
CPC ........ H04L 45/122; H04L 45/20; H04L 45/22
See application file for complete search history.

(56) References Cited

U.S. PATENT DOCUMENTS

| | | |
|---|---|---|
| 4,888,690 A | 12/1989 | Huber |
| 7,360,954 B1 | 4/2008 | Seaver et al. |
| 7,440,494 B2 | 10/2008 | Baba |
| 8,463,122 B2 | 6/2013 | Sadananda et al. |
| 8,611,232 B2 | 12/2013 | Xu et al. |
| 8,635,272 B2 | 1/2014 | Reisman |
| 8,665,240 B2 | 3/2014 | Westerman et al. |
| 8,850,507 B2 | 9/2014 | Reisman |
| 9,054,915 B1 | 6/2015 | Bugenhagen et al. |
| 9,081,216 B2 | 7/2015 | Sugiyama |
| 9,112,252 B2 | 8/2015 | Kagaya |

(Continued)

OTHER PUBLICATIONS

Grandhye, Nagendra B., "System and Method for Splitting Data Elements for Data Communication Based on Transformation Types Implemented on the Data Elements at Different Devices," U.S. Appl. No. 17/583,634, filed Jan. 25, 2022, 58 pages.

*Primary Examiner* — Hashim S Bhatti

(57) ABSTRACT

A system accesses a set of devices transferring a data element from a source device to a destination device. The system determines a transformation type implemented on the data element at each device. The system generates an array that uniquely defines the data element at each device. The array comprises the transformation type and an identifier of the device. The system generates a transformation dependency map that represents a set of transformation types implemented on the data element at different devices. The system determines a set of data transfer paths for the data element from the source device to the destination device based on the transformation dependency map. The system selects the shortest data transfer path for the data element that corresponds to the least number of hops between devices. The system communicates the data element from the source device to the destination device using the shortest data transfer path.

20 Claims, 6 Drawing Sheets

(56) References Cited

U.S. PATENT DOCUMENTS

| | | |
|---|---|---|
| 9,166,696 B2 | 10/2015 | Wu et al. |
| 9,171,008 B2 | 10/2015 | Prahlad et al. |
| 9,264,270 B2 | 2/2016 | Lusted et al. |
| 9,288,143 B2 | 3/2016 | Stuart |
| 9,349,234 B2 | 5/2016 | Ricci |
| 9,369,371 B2 | 6/2016 | Filsfils et al. |
| 9,405,865 B2 | 8/2016 | Li et al. |
| 9,411,100 B2 | 8/2016 | Fontaine et al. |
| 9,533,096 B2 | 1/2017 | Lebel et al. |
| 9,602,387 B2 | 3/2017 | Wood |
| 9,671,572 B2 | 6/2017 | Decker et al. |
| 9,712,447 B2 | 7/2017 | Wood et al. |
| 9,817,294 B2 | 11/2017 | Goi et al. |
| 9,900,249 B2 | 2/2018 | Awano |
| 9,901,252 B2 | 2/2018 | Tran |
| 9,989,724 B2 | 6/2018 | Raza et al. |
| 10,009,108 B2 | 6/2018 | Elahmadi et al. |
| 10,020,907 B2 | 7/2018 | Wei et al. |
| 10,040,193 B2 | 8/2018 | Kobayashi et al. |
| 10,097,271 B2 | 10/2018 | Doerr |
| 10,341,747 B2 | 7/2019 | Lee et al. |
| 10,355,940 B2 | 7/2019 | Wolting |
| 10,355,996 B2 | 7/2019 | Kumar et al. |
| 10,412,615 B2 | 9/2019 | Edsall et al. |
| 10,419,152 B2 | 9/2019 | Hanneman, Jr. |
| 10,496,770 B2 | 12/2019 | Kumar et al. |
| 10,742,537 B2 | 8/2020 | Psenak et al. |
| 10,785,093 B2 | 9/2020 | Khanna et al. |
| 10,819,605 B2 | 10/2020 | Li et al. |
| 10,833,976 B2 | 11/2020 | Saad et al. |
| 10,869,199 B2 | 12/2020 | Raleigh et al. |
| 11,032,197 B2 | 6/2021 | Nainar et al. |
| 2016/0156999 A1 | 6/2016 | Liboiron-Ladouceur et al. |
| 2016/0359735 A1 | 12/2016 | Zhao et al. |
| 2018/0069668 A1 | 3/2018 | Jorgensen |
| 2018/0152311 A1 | 5/2018 | Ansari et al. |
| 2019/0243164 A1 | 8/2019 | Nelson et al. |
| 2020/0127915 A1* | 4/2020 | Matsushita ............. H04L 45/12 |
| 2020/0348906 A1 | 11/2020 | Barnes, Jr. |
| 2021/0013985 A1 | 1/2021 | Shibahara et al. |
| 2021/0058826 A1* | 2/2021 | Mao ................. H04W 28/0808 |

\* cited by examiner

SYSTEM AND METHOD FOR DETERMINING THE SHORTEST DATA TRANSFER PATH IN DATA COMMUNICATION

TECHNICAL FIELD

The present disclosure relates generally to data communication, and more specifically to a system and method for determining the shortest data transfer path in data communication.

BACKGROUND

Within an organization, a large number of data elements are transferred among devices. The data elements may be communicated from a source device to a destination via multiple hops between multiple devices. Each data element may undergo a transformation at each device before the data element reaches the destination device. In some cases, a data element may be communicated to a device even though the data element is not transformed at that device.

SUMMARY

The system described in the present disclosure is particularly integrated into practical applications of improving data communication and data routing efficiency among computing devices. This, in turn, provides an additional practical application of improving network bandwidth allocation efficiency and utilization. Furthermore, the system described in the present disclosure provides an additional practical application of reducing network congestion. As such, the technology disclosed in the present disclosure improves the data communication technology and underlying operations of network nodes, servers, switches, and routers that communicate data among devices. These practical applications are described below.

Determining the Shortest Data Transfer Paths for Data Elements

The present disclosure contemplates systems and methods configured to determine the shortest data transfer paths for data elements from a source device to a destination device and communicate each data element using its respective shortest data transfer path. To this end, the disclosed system may perform one or more of the following operations for each data element. The data element may include any type of data/information related to an organization and/or clients of the organization, such as an application form for opening a new account, a user request related to a service and/or a product that the organization provides, etc.

The disclosed system accesses a set of devices transferring the data element from the source device to the destination device. The disclosed system determines the existing and/or historical data transfer path for the data element.

The disclosed system determines at which devices the data element is transformed—i.e., goes through a transformation type. The transformation type may indicate a type of change implemented on the data element. For example, the transformation type may include merging, aggregating, normalizing, summarizing, filtering, enriching, splitting, joining, or removing duplicated data operation implemented on the data element. The disclosed system also determines at which devices the data element is not transformed—i.e., does not go through any transformation type operation. Based on this information, the disclosed system generates an array that uniquely defines the data element and its transformation type at each device.

The disclosed system may perform a similar operation for each data element, meaning evaluate each data element at each device and determine whether a data element goes through a transformation type at a given device. Based on this information, the disclosed system determines a device dependency map that represents dependencies and correlations between the set of devices. The device dependency map may include data transfer paths of data elements between devices transferring the data elements from the source device to the destination device.

The disclosed system determines a transformation dependency map that represents a set of transformation types implemented on each data element at a given device from among the devices.

The disclosed system determines a set of data transfer paths for the data element from the source device to the destination device based on the historical and existing data transfer paths for the data element, the device dependency map, and the transformation dependency map. Each of the set of data transfer paths may include a different number of hops between the devices.

The disclosed system selects the shortest data transfer path for each data element based on the device dependency map and transformation dependency map. The shortest data transfer path may correspond to a data transfer path for the data element that includes the least number of hops between the devices. The disclosed system may communicate the data element from the source device to the destination device using the shortest data transfer path. The disclosed system may reconstruct or revise the current and future communications of the data element according to the shortest data transfer path.

In one embodiment, a system for communicating data elements using the shortest data transfer path among devices comprises a memory and a processor. The memory is configured to store one or more data elements. The processor is operably coupled with the memory. The processor accesses a set of devices transferring the one or more data elements from a source device to a destination device. The processor performs one or more following operations for a data element from among the one or more data elements at a given device from among the set of devices. The processor determines a transformation type implemented on the data element, wherein the transformation type represents a type of change made to the data element. The processor generates an array that uniquely defines the data element, wherein the array comprises the transformation type and an identifier of the given device. The processor generates a transformation dependency map that represents a set of transformation types implemented on the data element at different devices from among the set of devices. The processor determines a set of data transfer paths for the data element from the source device to the destination device based at least in part upon the transformation dependency map. Each of the set of data transfer paths has a different number of hops between the set of devices. The processor selects the shortest data transfer path from among the set of data transfer paths for the data element from the source device to the destination device that corresponds to the least number of hops between devices. The processor communicates the data element from the source device to the destination device using the shortest data transfer path.

Splitting Data Elements Based on Transfer Paths and Transformation Types

The present disclosure contemplates systems and methods configured to split data elements based on their respective transfer paths and transformation types at different devices. For example, the disclosed system determines that a first subset of data elements is transformed in a first subset of devices, and a second subset of data elements is transformed in a second subset of devices.

The second subset of devices may be different from the first subset of devices. The disclosed system determines that the first subset of data elements is transformed using one or more first transformation types, and the second subset of data elements is transformed using one or more second transformation types. Based on this information and the device dependency map and transformation dependency map described above, the disclosed system determines that the plurality of data elements should be split into the first subset of data elements and the second subset of data elements. Thus, the disclosed system splits the plurality of data elements into the first subset of data elements and the second subset of data elements.

The disclosed system communicates the first subset of data elements using a first transfer path through the first subset of devices, and communicates the second subset of data elements using a second transfer path through the second subset of devices. The first data transfer path may correspond to the shortest data transfer path for the first subset of data elements that is determined based on the device dependency map, transformation dependency map, historical and/or existing data transfer paths, etc. The second data transfer path may correspond to the shortest data transfer path for the second subset of data elements that is determined based on the device dependency map, transformation dependency map, historical and/or existing data transfer paths, etc.

In one embodiment, a system for splitting data elements based on transformation types at different devices comprises a memory and a processor. The memory is configured to store a plurality of data elements. The processor accesses a set of devices transferring the plurality of data elements from a source device to a destination device. The processor determines that a first subset of data elements from among the plurality of data elements is transformed in a first subset of devices from among the set of devices. The processor determines that a second subset of data elements from among the plurality of data elements is transformed in a second subset of devices from among the set of devices, where the second subset of devices is different from the first subset of devices. The processor splits the plurality of data elements into the first subset of data elements and the second subset of data elements based at least in part upon the determination that first subset of data elements is transformed in the first subset of devices and the second subset of data elements is transformed in the second subset of devices. The processor communicates the first subset of data elements using a first transfer path through the first subset of devices. The processor communicates the second subset of data elements using a second transfer path through the second subset of devices.

In summary, the disclosed system provides several practical applications and technical advantages, which include: 1) technology that improves network data routing by determining the shortest data transfer path for a data element from a source device to a destination device based on evaluating the data element at each device, determining whether the data element is transformed at each device using a transformation type; 2) technology that reduces network congestion by communicating the data element only to devices where the data element is transformed using a transformation type; 3) technology that improves network data communication and routing by reconstructing or revising the current and future communications of the data elements according to their respective determined shortest data transfer paths; 4) technology that reduces load processing at each device by splitting data elements based on data transfer paths and transformation types at each device.

As such, the disclosed system may be integrated into a practical application of improving data communication and data routing efficiency among computing devices. For example, the disclosed system only routes the data element through devices where the data element is transformed using a transformation type and bypasses the data element from (or does not route the data element to) devices where the data element is not transformed using a transformation type. This leads to eliminating or reducing unnecessary communication of the data element to devices where the data element is not transformed.

This, in turn, leads to less network bandwidth to be utilized for communicating the data element to reach the destination device. Thus, the disclosed system improves the network bandwidth utilization efficiency. Furthermore, the unoccupied network bandwidth may be allocated for other data communication. Thus, the disclosed system improves the network bandwidth allocation efficiency. Furthermore, since less network bandwidth will be utilized for communicating the data element, network congestion is reduced. Furthermore, the disclosed system improves the underlying operations of network nodes, servers, switches, and routers that communicate data among devices because processing load is reduced at these devices.

Furthermore, the disclosed system may be integrated into an additional practical application of reducing processing load at each device by splitting the data elements and routing each data element via devices where the data element is transformed using a transformation type. Because the data elements are split and not every data element is routed to every device, each device only needs to process data that it receives. Thus, the processing load at each device is reduced.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to determine the shortest data transfer path for a data element or communicate the data element using the shortest data transfer path, and split a plurality of data elements based on transfer paths and transformation types of the data elements. This disclosure provides various systems and methods to determine the shortest data transfer path for each data element, split a plurality of data elements based on transfer paths and transformation types of the data elements, and communicate each data element using its respective shortest data transfer path. Embodiments of the present disclosure and its advantages may be understood by referring to FIGS. 1 through 6. FIGS. 1 through 6 are used to describe a system and method for communicating data elements using the shortest data transfer path and splitting a plurality of data elements based on transfer paths and transformation types of the data elements.

System Overview

Figure 1:
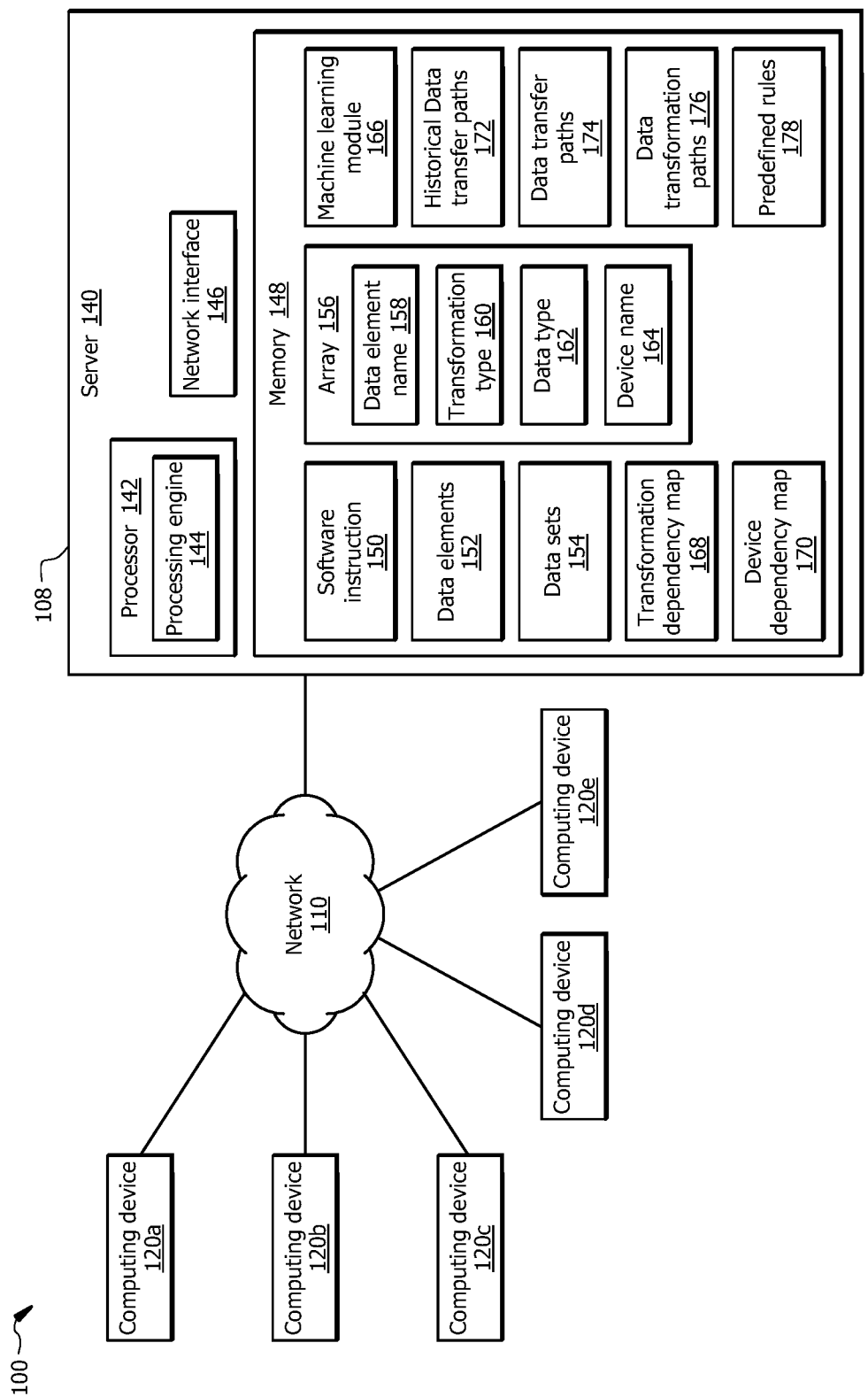
FIG. 1 illustrates an embodiment of a system configured to communicate data elements using the shortest data transfer path.

FIG. 1 illustrates one embodiment of a system 100 that is configured to determine the shortest data transfer path 174 for each data element 152 from a source device 120 to a destination device 120 and communicate the data element 152 from the source device 120 to the destination device 120 using the shortest data transfer path 174. In one embodiment, system 100 comprises a server 140 communicatively coupled with one or more computing device 120 via a network 110. Network 110 enables the communication between components of the system 100. Server 140 comprises a processor 142 in signal communication with a memory 148. Memory 148 stores software instructions 150 that when executed by the processor 142, cause the processor 142 to perform one or more functions described herein. For example, when the software instructions 150 are executed, the processor 142 executes the processing engine 144 to determine 1) which data element(s) 152 is transformed (e.g., modified, added with new data, data removed therefrom, etc.) at which computing device(s) 120; 2) determine which data element(s) 152 is not transformed (e.g., remains the same) and is passed through which computing device(s) 120; 3) determine transformation dependency map 168 and device dependency map 170; 4) based on this information, determine the shortest data transfer path 174 for each data element 152; 5) split the data elements 152 according to their data transfer paths 174 and transformation types 160 at different devices 120; and 6) communicate the data element 152 from the source device 120 to the destination device 120 using the shortest data transfer path 174. In other embodiments, system 100 may not have all of the components listed and/or may have other elements instead of, or in addition to, those listed above.

In general, the system 100 improves data transmission and data routing efficiency among computing devices 120. In the present disclosure, a computing device 120 may interchangeably be referred to as a device 120. Within an organization 108, a large amount of data is communicated between devices 120 associated with the organization 108. A particular data element 152 may be communicated to a device 120 for processing. In an example scenario, assume that the particular data element 152 is originated from a source computing device 120a. The data element 152 may include any data/information and activates related to clients of the organization 108, such as opening new accounts, user requests related to a service and/or a product that the organization 108 provides, etc. The data element 152 may go through one or more stages at one or more computing devices 120 to reach a destination computing device 120e. For example, the data element 152 may go through a user authentication stage, an initial approval stage, or a revision stage, among others.

At each device 120, the data element 152 may be transformed or changed—i.e., go through a transformation type 160. For example, additional information may be added to the data element, particular information associated with the data element 152 may be removed, or particular information associated with the data element 152 may be modified or changed. For example, the transformation type 160 may indicate merging, aggregating, normalizing, summarizing, filtering, enriching, splitting, joining, or removing duplicated data operation associated with and/or performed on the data element 152. For example, assume that the data element 152 comprises a fillable application form. In this example, the data element 152 may be transformed at a device 120b when additional information is added to the application form at the device 120b. In certain embodiments, the transformation type 160 may comprise a transformation of data element 152 from one data format to another, e.g., from a first data format used by and compatible to a source device 120a into a second data format required by a destination device 120e.

Upon going through these such stages, the data element 152 may be communicated to the destination device 120e, for example, to fulfill the user request associated with the data element 152. Thus, the data element 152 may traverse a particular data transfer path 174 from the source device 120a to the destination device 120e.

Different data elements 152 may not need to go through the same stages and the same devices 120. In other words, different data elements 152 may not have the same data transfer paths 174 through the same devices 120. For example, a first data element 152 may not be transformed by a transformation type 160 (e.g., data addition, data removal, data modification) at the device 120b, while a second data element 152 may be transformed by transformation type 160 at the device 120b. Thus, in this example, the first data element 152 may not have to be communicated to the device 120b, while the second data element 152 may have to be communicated to the device 120b.

One potential approach is to combine all the data elements 152 originated from the device 120a and use the same data transfer path 174 for communicating the data elements 152 from the source device 120a to the destination device 120e. However, this approach suffers from multiple drawbacks, including network congestion in transmitting the data elements 152 as a result of a large volume of data elements 152 and unnecessarily occupying network bandwidth with all of the data elements 152 through the devices 120a-e.

Therefore, system 100 is configured to determine which data element(s) 152 is transformed at which computing device(s) 120, determine which data element(s) 152 is not transformed at which computing device(s) 120, determine transformation dependency map 168 and device dependency map 170, based on this information, determine the shortest data transfer path 174 for each data element 152, and communicate the data element 152 from the source device 120 to the destination device 120 using the shortest data transfer path 174.

In this manner, system 100 reduces the network congestion and improved data transmission and communication among devices 120. Furthermore, the system 100 improves the network bandwidth utilization and efficiency in network routing.

System Components

Network

Network 110 may be any suitable type of wireless and/or wired network, including, but not limited to, all or a portion of an Internet, an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network. The network 110 may be configured to support any suitable type of communication protocol as would be appreciated by one of ordinary skill in the art.

Computing Device

Each of the computing devices 120a to 120e is an instance of a computing device 120. Computing device 120 is generally any device that is configured to process data and interact with users. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by a user. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120. The computing device 120 is configured to communicate with other devices via the network 110. For example, the computing device 120 may communicate with a device (e.g., other computing devices 120 and the server 140). The computing devices 120 may be associated with the organization 108.

Server

Server 140 is generally a device that is configured to process data and communicate with computing devices (e.g., computing devices 120), databases, systems, etc., via the network 110. The server 140 may be associated with the organization 108. The server 140 is generally configured to oversee the operations of the processing engine 144, as described further below in conjunction with the operational flow 200 of system 100 described in FIG. 2, method 300 described in FIG. 3, method 400 described in FIG. 4, and use cases described in FIGS. 5 and 6.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors 142 may be implemented in cloud devices, servers, virtual machines, and the like. The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the processing engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-6. For example, the processor 142 may be configured to perform one or more operations of method 300 as described in FIG. 3 and one or more operations of method 400 described in FIG. 4.

Network interface 146 is configured to enable wired and/or wireless communications. The network interface 146 may be configured to communicate data between the server 140 and other devices, systems, or domains. For example, the network interface 146 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 142 may be configured to send and receive data using the network interface 146. The network interface 146 may be configured to use any suitable type of communication protocol as would be appreciated by one of ordinary skill in the art.

The memory 148 may be volatile or non-volatile and may comprise read-only memory (ROM), random-access memory (RAM), ternary content-addressable memory (TCAM), dynamic random-access memory (DRAM), and static random-access memory (SRAM). The memory 148 may include one or more of a local database, cloud database, network-attached storage (NAS), etc. The memory 148 comprises one or more disks, tape drives, or solid-state drives, and may be used as an over-flow data storage device, to store programs when such programs are selected for execution, and to store instructions and data that are read during program execution. The memory 148 may store any of the information described in FIGS. 1-6 along with any other data, instructions, logic, rules, or code operable to implement the function(s) described herein when executed by processor 142. For example, the memory 148 may store software instructions 150, data elements 152, data sets 154, arrays 156, transformation dependency map 168, device dependency map 170, machine learning module 166, historical (and/or existing) data transfer paths 172, data transfer paths 174, data transformation paths 176, predefined rules 178, and/or any other data or instructions. The software instructions 150 may comprise any suitable set of instructions, logic, rules, or code operable to execute the processor 142 and perform the functions described herein, such as some or all of those described in FIGS. 1-6.

Processing Engine

Processing engine 144 may be implemented by the processor 142 executing the software instructions 150, and is generally configured to perform one or more operations described herein. For example, the processing engine 144 may be configured to determine 1) existing and/or historical data transfer paths 172 of data elements 152 between devices 120a to 120e; 2) which data element(s) 152 is transformed (e.g., modified, added with new data, data removed therefrom, etc.) at which computing device(s) 120; 3) determine which data element(s) 152 is not transformed (e.g., remains the same) and is passed through which computing device(s) 120; 4) determine transformation dependency map 168 and device dependency map 170; 5) based on this information, determine the shortest data transfer path 174 for each data element 152; and 6) communicate the data element 152 from the source device 120 to the destination device 120 using the shortest data transfer path 174. The operations of the processing engine 144 are described in greater detail in the operational flow 200 of system 100 described in FIG. 2, method 300 described in FIG. 3, method 400 described in FIG. 4, and use cases described in FIGS. 5 and 6. In certain embodiments, the processing engine 144 may be implemented by supervised machine learning, semi-supervised machine learning, and/or unsupervised machine learning algorithm. For example, the machine learning module 166 may comprise a support vector machine, neural network, random forest, k-means clustering, etc. In another example, the machine learning module 166 may be implemented by a plurality of neural network (NN) layers, Convolutional NN (CNN) layers, Long-Short-Term-Memory (LSTM) layers, Bidirectional LSTM layers, Recurrent NN (RNN) layers, and the like.

The processing engine 144 may implement the machine learning module 166 to determine which data element(s) 152 is not transformed at which computing device(s) 120, determine transformation dependency map 168 and device dependency map 170, and based on this information, determine the shortest data transfer path 174 for each data element 152.

To this end, the processing engine 144 may identify historical and/or existing data transfer paths 17 of data elements 152 between devices 120. In this process, the processing engine 144 may access each device 120 identify data elements 152 at each device 120. The processing engine 144 may identify data transfer paths 172 of data elements 152 between devices 120 based on historical data transfer paths 174 of the data elements 152 between the devices 120. An example illustration of historical and/or existing data transfer paths 172 of data elements 152 between devices 120 is shown in FIG. 2.

Although FIG. 1 describes determining data transfer paths 174 for data elements between devices 120a to 120e, system 100 may be configured to determine data transfer paths 174 for data elements 152 between any number of devices 120.

Figure 2:
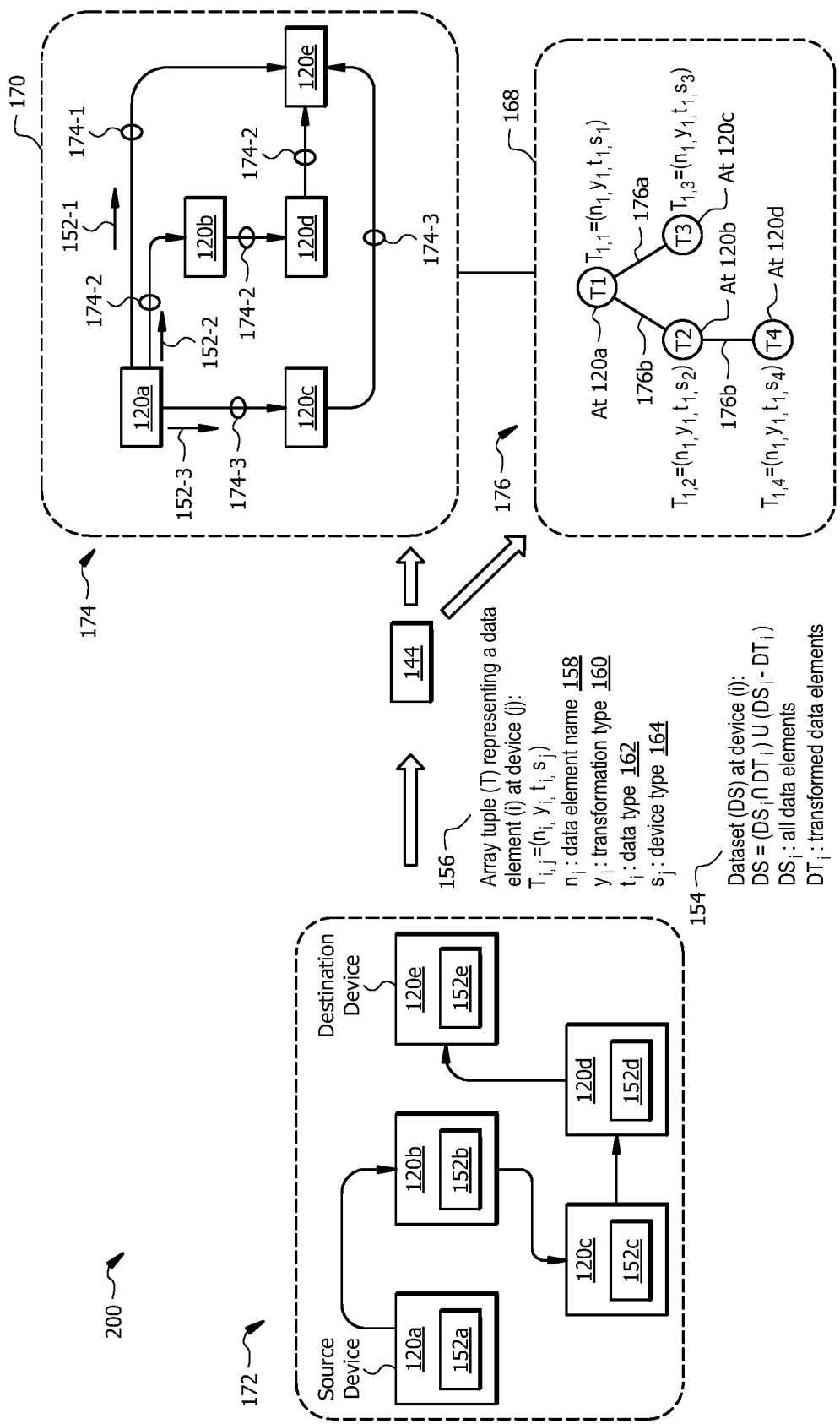
FIG. 2 illustrates an example operational flow of the system of FIG. 1.

Example Operational Flow for Communicating Data Elements Using the Shortest Data Transfer Path FIG. 2 illustrates an example operational flow 200 of system 100 of FIG. 1 for communicating the data elements 152 using their respective shortest data transfer path 174. The operational flow 200 may begin when the processing engine 144 identifies the historical and/or existing data transfer paths 172 of data elements 152 between devices 120a to 120e.

In an example scenario, assume that the devices 120a to 120e are transferring one or more data elements 152 from a source device 120a to a destination device 120e. The processing engine 144 may identify the historical and/or existing data transfer paths 172 of data elements 152 between the devices 120a to 120e by accessing each of the devices 120a to 120e and determining data elements 152 at each data element 152. The processing engine 144 may access each device 120a to 120e via the network 110.

Generating an Array Uniquely Identifying Each Data Element at Each Device

Upon accessing each of the devices 120a to 120e, the processing engine 144 determines the status of each data element 152 at each device 120a to 120e. The status of each data element 152 may indicate whether the data element 152 is being transformed (e.g., changed) and a type of a transformation implemented on the data element 152 (e.g., a transformation type 160 implemented on the data element 152). The processing engine 144 may perform one or more of the following operations for each data element 152 at a given device 120 from among the set of devices 120a to 120e.

The processing engine 144 determines a transformation type 160 implemented on the data element 152. The transformation type 160 may represent a type of change made to the data element 152. In certain embodiments, the transformation type 160 may comprise an addition to the data element 152, a reduction from the data element 152, or a modification of the data element 152, similar to that described in FIG. 1.

In certain embodiments, the transformation type 160 may comprise transformation details associated with the data element 152, e.g., what has been changed, modified, and/or transformed in the data element 152. For example, the transformation type 160 may indicate merging, aggregating, normalizing, summarizing, filtering, enriching, splitting, joining, or removing duplicated data operations associated with and/or performed on the data element 152.

In certain embodiments, the transformation type 160 may comprise a transformation of data element 152 from one data format to another, e.g., from a first data format used by and compatible to a source device 120a into a second data format required by a destination device 120e.

To determine the transformation type 160 implemented on the data element 152 at a particular device 120, the processing engine 144 may evaluate the status of the data element 152 at the input buffer of the particular device 120, the change made to the data element 152 at the particular device 120, and evaluate the status of the data element 152 in the output buffer of the particular device 120.

The processing engine 144 identifies the device 120 where the transformation type 160 is implemented on the data element 152. The processing engine 144 generates an array 156 that uniquely identifies the data element 152 at the given device 120. The data type 162 may comprise a number, a character, a character string, a composite type, or any combination thereof. The composite data type may include a list, an array, a matrix, etc.

As can be seen in FIG. 2, an example array 156 identifying a data element 152 ($i$) at a device 120 ($j$) is represented according to equation (1):

$$T_{i,j} = (n_i, y_i, s_j) \quad \text{Equation (1)}$$

where $T_{i,j}$ represents the array 156, $n_i$ represents the data element name 158, $y_i$ represents transformation type 160, and $s_j$ represents the device 120. In this manner, the processing engine 144 may generate multiple arrays 156 for each data element 152 at different devices 120 representing the transformation type 160 that the data element 152 experiences at different devices 120. The processing engine 144 may perform a similar operation for each data element 152 at each device 120a to 120e.

With respect to device 120a, the processing engine 144 accesses the device 120a, identifies that the data elements 152a are being processed by the device 120a, and determines one or more first transformation types 160 that each data element 152a is experiencing. With respect to device 120b, the processing engine 144 accesses the device 120b, identifies that the data elements 152b are being processed by the device 120b, and determines one or more second transformation types 160 that each data element 152b is experiencing. The data elements 152b may correspond to the data elements 152a after the first one or more transformation types 160 implemented on the data elements 152a. With respect to device 120c, the processing engine 144 accesses the device 120c, identifies that the data elements 152c are being processed by the device 120c, and determines a third one or more transformation types 160 that each data element 152c is experiencing. The data elements 152c may correspond to the data elements 152b after the second one or more transformation types 160 implemented on the data elements 152b. With respect to device 120d, the processing engine 144 accesses the device 120d, identifies that the data elements 152d are being processed by the device 120d, and determines a fourth one or more transformation types 160 that each data element 152d is experiencing. The data elements 152d may correspond to the data elements 152c after the third one or more transformation types 160 implemented on the data element 152c. With respect to the destination device 120e, the processing engine 144 accesses the destination device 120e, identifies the data elements 152e at the destination device 120e, and determines the changes made to the data elements 152e. The data elements 152e may correspond to the data elements 152d after the fourth one or more transformation types 160 implemented on the data elements 152d.

In this manner, the processing engine 144 determines which data element(s) 152 is transformed at which computing device(s) 120 and which data element(s) 152 is not transformed at which computing device(s) 120. The processing engine 144 uses this information in determining the transformation dependency map 168 and the device dependency map 170.

Generating Data Sets of Data Elements

The processing engine 144 generates data sets 154 comprising data elements 152 at each device 120. In this process, the processing engine 144 defines each data set 154 at a given device 120 in terms of data elements 152 that are transformed (e.g., using a transformation type 160) and data elements 152 that are not transformed. For example, an example data set 154 (DS) at the device 120 (i) may be represented according to equation (2).

$$DS = (DS_i \cap DT_i) \cup (DS_i - DT_i)$$ Equation (2)

where $DS_i$ represents all the data elements 152 at the device 120 (i), $DT_i$ represents transformed data elements 152 (e.g., using a transformation type 160) at the device 120 (i), notation ($\cap$) represents a set intersection function, notation ($\cup$) represents a union function, and notation (−) represent a deduction function.

In equation (2), notation ($DS_i \cap DT_i$) represents the set intersection of all data elements 152 and the transformation data elements 152 (e.g., using a transformation type 160). Notation ($DS_i - DT_i$) represents all data elements 152 ($DS_i$) except the transformed data elements 152 ($DT_i$), meaning data elements 152 that are not transformed at the device 120 (i), i.e., data elements 152 are passing through the devices 120 (i) without change.

The processing engine 144 may determine data sets 154 of data elements 152 at each device 120 using the equation (2). The processing engine 144 uses this information in determining the transformation dependency map 168 and the device dependency map 170.

Determining a Device Dependency Map

The processing engine 144 determines a device dependency map 170 by feeding the arrays 156 indicating transformation types 160 of data elements 152 at each device 120 (according to equation (1)) and the status of the data elements 152 and data sets 154 at each device 120 (according to equation (2)) to the machine learning module 166. The machine learning module 166 uses the input data to determine the data transfer paths 174 of the data elements 152 between devices 120a to 120e.

The data transfer path 174 of a data element 152 goes through devices 120 where the data element 152 is transformed using a transformation type 160. In other words, the processing engine 144 excludes or removes device(s) 120 where the data element 152 is not transformed from the data transfer path 174 of the data element 152. For example, if the processing engine 144 determines that the data element 152 is passed through a particular device 120 without being transformed using a transformation type 160, the processing engine 144 removes the particular device 120 from the data transfer paths 174 for the data element 152.

An example of device dependency map 170 is shown in FIG. 2. The device dependency map 170 may represent dependencies and correlations between devices 120. In the example of FIG. 2, the processing engine 144 (e.g., via the machine learning module 166) may determine that a first set of data elements 152-1 from among the data elements 152a (at the source device 120a) are only transformed at the source device 120a (using a transformation type 160) and are not transformed (using a transformation type 160) at devices 120b, 120c, and 120d. Thus, the processing engine 144 may determine that the first set of data elements 152-1 may be communicated from the source device 120a to the destination device 120e. In other words, the processing engine 144 may determine a transfer path 174-1 for the first set of data elements 152-1 is from the source device 120a to the destination device 120e.

Further, in the example of FIG. 2, the processing engine 144 (e.g., via the machine learning module 166) may determine that a second set of data elements 152-2 from among the data element 154a (at the source device 120a) are only transformed (using a transformation type 160) at devices 120a, 120b, and 120d and not transformed (using a transformation type 160) at device 120c. Thus, the processing engine 144 may determine that the transfer path 174-2 for the second set of data elements 152-2 is through devices 120a, 120b, 120d, and 120e.

Further, in the example of FIG. 2, the processing engine 144 (e.g., via the machine learning module 166) may determine that a third set of data elements 152-3 from among the data elements 152a (at the source device 120a) are only transformed (using a transformation type 160) at devices 120a and 120c and not transformed (using a transformation type 160) at devices 120b and 120d. Thus, the processing engine 144 may determine that the transfer path 174-3 for the third set of data elements 152-3 is through devices 120a, 120c, and 120e.

In certain embodiments, the processing engine 144 may split the data elements 152a into the first set of data elements 152-1, the second set of data elements 152-2, and the third set of data elements 152-3 based on the determination of whether each data element 152 from among the data elements 152a is transformed using a transformation type 160 at each device 120.

Upon splitting the data elements 152a into the first set of data elements 152-1, the second set of data elements 152-2, and the third set of data elements 152-3, the processing engine 144 may proceed to determine the data transfer paths 174-1, 174-2, and 174-3 for the sets of data elements 152-1, 152-2, and 152-3, respectively.

Determining a Transformation Dependency Map

The processing engine 144 determines a transformation dependency map 168 by feeding the arrays 156 indicating transformation types 160 of data elements 152 at each device 120 (according to equation (1)) and the status of the data elements 152 and data sets 154 at each device 120 (according to equation (2)) to the machine learning module 166. The machine learning module 166 uses the input data to determine the data transfer paths 174 and data transformation paths 176 of the data elements 152 between devices 120a to 120e. The data transformation path 176 of a data element 152 indicates what transformation types 160 the data element 152 goes through at each device 120.

The transformation dependency map 168 of a particular data element 152 may represent dependencies and correlations among the set transformation types 160 implemented on the particular data element 152 at different devices 120. In other words, the transformation dependency map 168 of a particular data element 152 may represent the set transformation types 160 implemented on the particular data element 152 at different devices 120.

In the example of FIG. 2, an example transformation dependency map 168 of a particular data element 152 is shown. The example transformation dependency map 168 includes stages T1 to T4 where a data element 152 is transformed using a transformation type 160.

In the illustrated example, at stage T1, the attributes of the data element 152 are represented by the array 156 "$T_{1,1}$" according to equation (3) which is an instance of equation (1) where the i=1 and j=1.

$$T_{1,1}=(n_1, y_1, t_1, s_1) \quad \text{equation (3)}$$

At stage T1, the data element 152 with the data element name 158 represented by "$n_1$" and data type 162 "$t_1$" is transformed using a first transformation type 160 (represented by "$y_1$") at device 120a (represented by "$S_1$").

At stage T2, the attributes of the data element 152 are represented by the array 156 "$T_{1,2}$" according to equation (4) which is an instance of equation (1) where the i=1 and j=2.

$$T_{1,2}=(n_1, y_1, t_1, s2) \quad \text{equation (4)}$$

At stage T2, the data element 152 with the data element name 158 represented by "$n_1$" and data type 162 "$t_1$" is transformed using a second transformation type 160 (represented by "$y_2$") at device 120b (represented by "$S_2$").

At stage T3, the attributes of the data element 152 are represented by the array 156 "$T_{1,3}$" according to equation (5) which is an instance of equation (1) where the i=1 and j=3.

$$T_{1,3}=(n_1, y_1, t_1, s_3) \quad \text{equation (5)}$$

At stage T3, the data element 152 with the data element name 158 represented by "$n_1$" and data type 162 "$t_1$" is transformed using a third transformation type 160 (represented by "$y_1$") at device 120c (represented by "$S_3$").

At stage T4, the attributes of the data element 152 are represented by the array 156 "$T_{1,4}$" according to equation (6) which is an instance of equation (1) where the i=1 and j=4.

$$T_{1,4}=(n_1, y_1, t_1, s_4) \quad \text{equation (6)}$$

At stage T4, the data element 152 with the data element name 158 represented by "$n_1$" and data type 162 "$t_1$" is transformed using a fourth transformation type 160 (represented by "$y_1$") at device 120d (represented by "$S_4$"). The lines between the stages T1 to T4 represent dependencies and correlations between the transformations of the data element 152 at devices 120a to 120e, i.e., the data transformation paths 176 of the data element 152.

Determining the Shortest Data Transfer Path for the Data Element

The processing engine 144 may use the transformation dependency map 168, the device dependency map 170, and historical and existing data transfer paths 172 to determine a set of data transfer paths 174 for the data element 152 from the source device 120a to the destination device 120e. Each of the set of data transfer paths 174 may have a different number of hops between the set of devices 120, similar to that described above with respect to transfer paths 174-1 to 174-3.

The processing engine 144 determines the shortest data transfer path 174 from among the set of data transfer paths 174 for the data element 152 from the source device 120a to the destination device 120e that corresponds to the least number of hops between devices 120.

In this manner, the data element 152 may only be communicated to device(s) 120 where a transformation type 160 is implemented on the data element 152. This obviates unnecessary batch data element 152 routing between all devices 120. Thus, network congestion is reduced, data transmission and communication efficiency are improved, and network bandwidth is improved.

In some embodiments, the processing engine 144 may determine the shortest data transfer path 174 further based on the predefined rule 178. The predefined rule 178 may indicate selecting a data transformation path 176 that maximizes data security and data quality for the data element 152. For example, the processing engine 144 may determine the shortest data transfer path 174 such that it corresponds to and/or includes the least number of hops between devices and maximizes data security and data quality for the data element 152.

In a case where two data transfer paths 174 for the data element 152 have the least number of hops for the data element 152 from the source device 120a to the destination device 120e, the processing engine 144 may identify a particular data transfer path 174 from among the two data transfer paths 174 based on the predefined rule 178 such that the selected data transfer path 174 maximizes data security and data quality. Similarly, the processing engine 144 may determine a data transfer path 174 (e.g., the data transfer paths 174-1, 174-2, and 174-3 described above) based on the predefined rule 178.

Determining the Shortest Data Transformation Path for the Data Element

The processing engine 144 may also determine the shortest transformation path 176 for the data element 152 from the source device 120a to the destination device 120e based on the transformation dependency map 168, the device dependency map 170, and historical and existing data transfer paths 172

In some embodiments, the shortest transformation path 176 for the data element 152 may further be determined according to the predefined rules 178 and the number of hops between the devices 120. In the example transformation dependency map 168 illustrated in FIG. 2, a first data transformation path 176a for the data element 152 is from device 120a to device 120c, and a second data transformation path 176b for the data element 152 is from device 120a to device 120b to device 120d.

The processing engine 144 determines which of the data transformation paths 176a or 176b should be selected for the data element 152 based on the predefined rule 178 and the number of hops between the devices 120. The processing engine 144 communicates each data element 152 from the source device 120a to the destination device 120e using its determined shortest data transfer path 174.

In a case where two data transmission paths 176 for the data element 152 have the least number of hops for the data element 152 from the source device 120a to the destination device 120e, the processing engine 144 may identify a particular data transmission path 176 from among the two data transmission paths 176 based on the predefined rule 178 such that the selected data transmission path 176 maximizes data security and data quality.

In this manner, the processing engine 144 determines the shortest data transfer path 174 and shortest data transformation path 176 for each data element 152 from the source device 120a to the destination device 120e. The processing engine 144 performs data communication for each data element 152 using its determined shortest data transfer path 174. In this process, the processing engine 144 reconstructs or revises the current data transmission of the data element 152 that is not using the respective shortest data transfer path 174.

Figure 3:
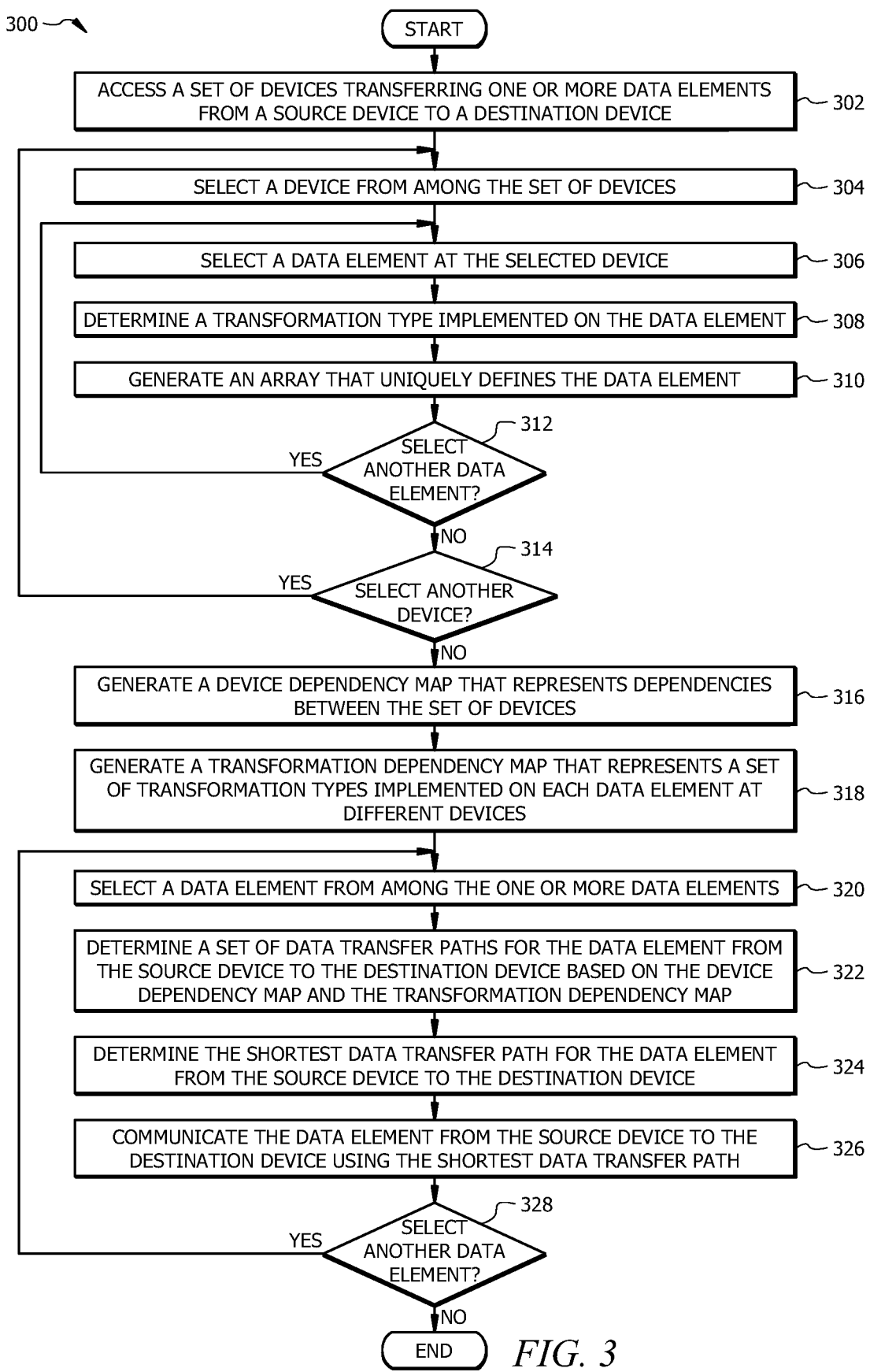
FIG. 3 illustrates an example flowchart of a method for communicating data elements using the shortest data transfer path.

Example Method for Communicating Data Elements Using the Shortest Data Transfer Path FIG. 3 illustrates an example flowchart of a method 300 configured to determine the shortest data transfer path 174 for each data element 152 from a source device 120 to a destination device 120 and communicate the data element 152 from the source device 120 to the destination device 120 using the shortest data transfer path 174. Modifications, additions, or omissions may be made to method 300. Method 300 may include more, fewer, or other steps. For example, steps may be performed in parallel or in any suitable order. While at times discussed as the system 100, server 140, or components of any of thereof performing operations, any suitable system or components of the system may perform one or more operations of the method 300. For example, one or more operations of method 300 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform operations 302-328.

At 302, the processing engine 144 access a set of devices 120 transferring one or more data elements 152 from a source device 120a to a destination device 120e. For example, the processing engine 144 may access the devices 120a to 120e that transfer data elements 152 from the source device 120a to the destination device 120e, via the network 110. In one embodiment, prior to 302, the processing engine 144 may determine historical and existing data transfer paths 172 for the one or more data elements 152 from the source device 120a to the destination device 120e.

At 304, the processing engine 144 selects a device 120 from among the set of devices 120. The processing engine 144 may iteratively select a device 120 until no device 120 is left for evaluation.

At 306, the processing engine 144 selects a data element 152 at the selected device 120. The processing engine 144 may iteratively select a data element 152 at the selected device 120 until no data element 152 at the selected device 120 is left for evaluation.

At 308, the processing engine 144 determines a transformation type 160 implemented on the data element 152. The transformation type 160 may represent a type of change made to the data element 152. Examples of the transformation type 160 are discussed in FIGS. 1 and 2.

At 310, the processing engine 144 generates an array 156 that uniquely defines the data element 152. The array 156 may be represented by multiple variables in a tuple. The array 156 may comprise the name of the data element 152 (i.e., data element name 158), the transformation type 160, a data type 162 associated with the data element 152, and an identifier of the device 120 (i.e., device name 164). An example representation of array 156 is discussed in FIG. 2 with respect to equation (1).

At 312, the processing engine 144 determines whether to select another data element 152.

The processing engine 144 determines to select another data element 152 if at least one data element 152 in the selected device 120 is left for evaluation. If the processing engine 144 determines to select another data element 152, method 300 returns to 306. Otherwise, method 300 proceeds to step 314.

At 314, the processing engine 144 determines whether to select another device 120. The processing engine 144 determines to select another device 120 if at least one device 120 is left for evaluation. If the processing engine 144 determines to select another device 120, method 300 returns to 304. Otherwise, method 300 proceeds to step 316.

At 316, the processing engine 144 generates a device dependency map 170 that represents dependencies between the set of devices 120. In this process, the processing engine 144 may follow the operational flow 200 described in FIG. 2 to generate the device dependency map 170.

At 318, the processing engine 144 generates a transformation dependency map 168 that represents a set of transformation types 160 implemented on each data element 152 at different devices 120. In this process, the processing engine 144 may follow the operational flow 200 described in FIG. 2 to generate the transformation dependency map 168.

At 320, the processing engine 144 selects a data element 152 from among the one or more data elements 152. The processing engine 144 may iteratively select a data element 152 until no data element 152 is left for evaluation.

At 322, the processing engine 144 determines a set of data transfer paths 174 for the data element 152 from the source device 120a to the destination device 120e based on the device dependency map 170 and the transformation dependency map 168, similar to that described in FIG. 2. For example, each of the set of data transfer paths 174 may have a different number of hops between the devices 120.

At 324, the processing engine 144 determines the shortest data transfer path 174 for the data element 152 from the source device 120a to the destination device 120e, similar to that described in FIG. 2. The shortest data transfer path 174 may have the least number of hops between the devices 120.

At 326, the processing engine 144 communicates the data element 152 from the source device 120a to the destination device 120e using the shortest data transfer path 174. In this process, the processing engine 144 may reconstruct the data transmission of the data element 152 for future data transmissions from the source device 120*a* to the destination device 120*e* using the shortest data transfer path 174.

At 328, the processing engine 144 determines whether to select another data element 152. The processing engine 144 determines to select another data element 152 if at least one data element 152 from among the one or more data elements 152 is left for evaluation. If the processing engine 144 determines to select another data element 152, method 300 returns to 320. Otherwise, method 300 is ended.

Example Method for Splitting Data Elements

Figure 4:
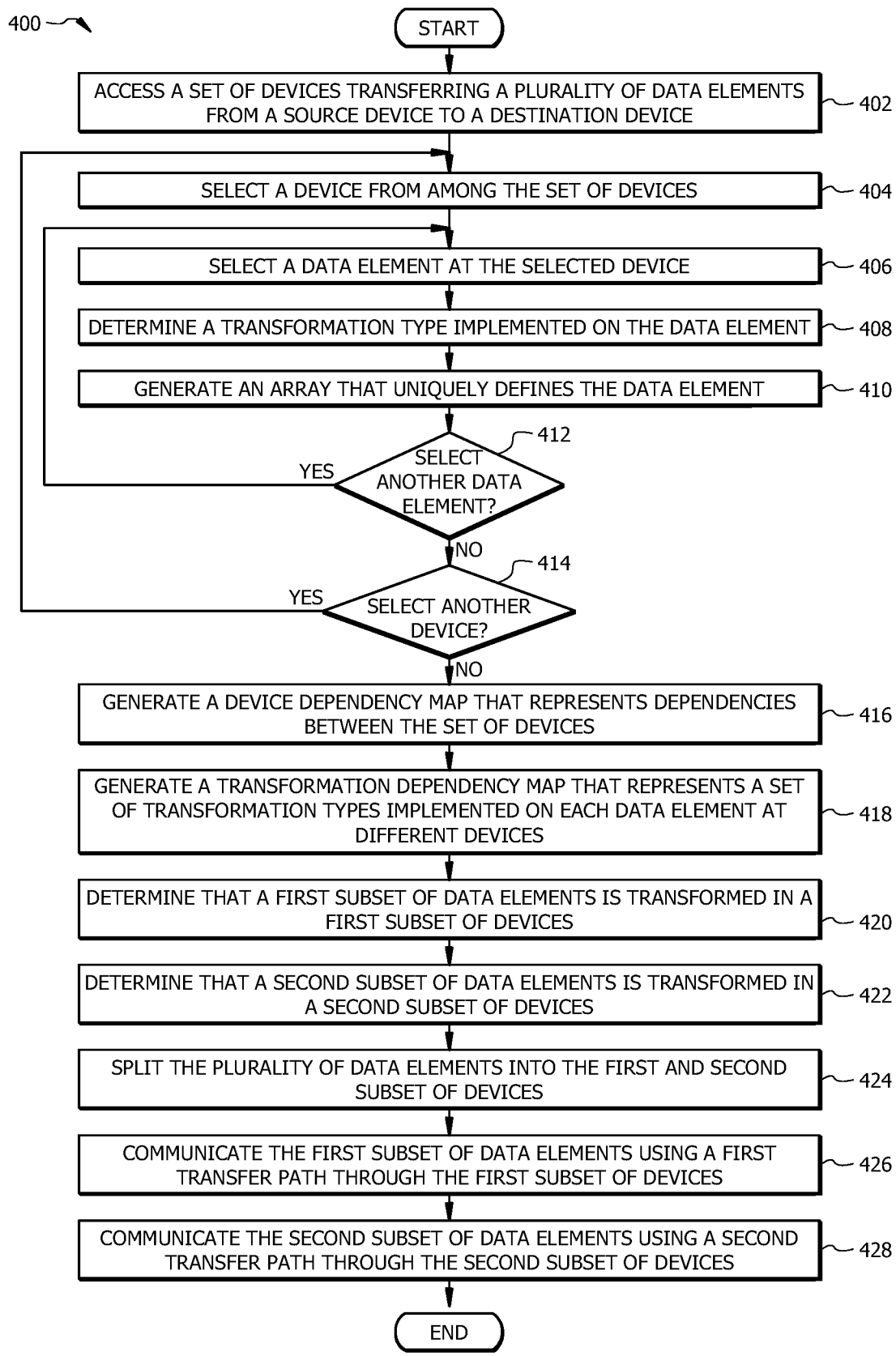
FIG. 4 illustrates an example flowchart of a method for splitting data elements based on transformation types at different devices.

FIG. 4 illustrates an example flowchart of a method 400 configured to split data elements 152 for transferring from a source device 120 to a destination device 120. Modifications, additions, or omissions may be made to method 400. Method 400 may include more, fewer, or other steps. For example, steps may be performed in parallel or in any suitable order. While at times discussed as the system 100, server 140, or components of any of thereof performing operations, any suitable system or components of the system may perform one or more operations of the method 400. For example, one or more operations of method 400 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform operations 402-428.

At 402, the processing engine 144 access a set of devices 120 transferring a plurality of data elements 152 from a source device 120*a* to a destination device 120*e*. For example, the processing engine 144 may access the devices 120*a* to 120*e* that transfer data elements 152 from the source device 120*a* to the destination device 120*e*, via the network 110. In one embodiment, prior to 402, the processing engine 144 may determine historical and existing data transfer paths 172 for the one or more data elements 152 from the source device 120*a* to the destination device 120*e*.

At 404, the processing engine 144 selects a device 120 from among the set of devices 120. The processing engine 144 may iteratively select a device 120 until no device 120 is left for evaluation.

At 406, the processing engine 144 selects a data element 152 at the selected device 120. The processing engine 144 may iteratively select a data element 152 at the selected device 120 until no data element 152 at the selected device 120 is left for evaluation.

At 408, the processing engine 144 determines a transformation type 160 implemented on the data element 152. The transformation type 160 may represent a type of change made to the data element 152. Examples of the transformation type 160 are discussed in FIGS. 1 and 2. At 410, the processing engine 144 generates an array 156 that uniquely defines the data element 152. The array 156 may be represented by multiple variables in a tuple. The array 156 may comprise the name of the data element 152 (i.e., data element name 158), the transformation type 160, a data type 162 associated with the data element 152, and an identifier of the device 120 (i.e., device name 164). An example representation of array 156 is discussed in FIG. 2 with respect to equation (1).

At 412, the processing engine 144 determines whether to select another data element 152.

The processing engine 144 determines to select another data element 152 if at least one data element 152 in the selected device 120 is left for evaluation. If the processing engine 144 determines to select another data element 152, method 400 returns to 406. Otherwise, method 400 proceeds to step 414.

At 414, the processing engine 144 determines whether to select another device 120. The processing engine 144 determines to select another device 120 if at least one device 120 is left for evaluation. If the processing engine 144 determines to select another device 120, method 400 returns to 404. Otherwise, method 400 proceeds to step 416.

At 416, the processing engine 144 generates a device dependency map 170 that represents dependencies between the set of devices 120. In this process, the processing engine 144 may follow the operational flow 200 described in FIG. 2 to generate the device dependency map 170.

At 418, the processing engine 144 generates a transformation dependency map 168 that represents a set of transformation types 160 implemented on each data element 152 at different devices 120. In this process, the processing engine 144 may follow the operational flow 200 described in FIG. 2 to generate the transformation dependency map 168.

At 420, the processing engine 144 determines that a first subset of data elements 152 is transformed in a first subset of devices 120.

For example, the processing engine 144 may determine that the first subset of data elements 152 is transformed in the first subset of devices 102 based on the transformation dependency map 168, device dependency map 170, historical and/or existing data transfer paths 172, and transformation types 160 associated with the first subset of data elements 152.

At 422, the processing engine 144 determines that a second subset of data elements 152 is transformed in a second subset of devices 120. For example, the processing engine 144 may determine that the second subset of data elements 152 is transformed in the second subset of devices 102 based on the transformation dependency map 168, device dependency map 170, historical and/or existing data transfer paths 172, and transformation types 160 associated with the second subset of data elements 152. In certain embodiments, the second subset of data elements 152 may be different from the first subset of data elements 152. In certain embodiments, the second subset of data elements 152 may have at least one data element 152 overlapping with the first subset of data elements 152. In such cases, the processing engine 144 may implement the operation described in the operational flow 200 in FIG. 2 to determine the shortest data transfer path 176 for the overlapping data element 152.

At 424, the processing engine 144 splits the plurality of data elements 152 into the first subset of data elements 152 and the second subset of data elements 152. The processing engine 144 may split the plurality of data elements 152 into the first subset of data elements 152 and the second subset of data elements 152 based at least the determinations in 420 to 422, including the determination that the first subset of data elements i152 is transformed in the first subset of devices 120 and the second subset of data elements 152 is transformed in the second subset of devices 120 and the determination that the first set of data elements 152 is transformed using the one or more first transformation types 160 and the second set of data elements 152 is transformed using the one or more second transformation types 160. The one or more first transformation types 160 may be different from the one or more second transformation 160. In certain embodiments, processing engine 144 splits the plurality of data elements 152 into the first subset of data elements 152 and the second subset of data elements 152 based at least on their respective transformation types 160 at different devices 120. In certain embodiments, processing engine 144 splits the plurality of data elements 152 into the first subset of data elements 152 and the second subset of data elements 152 based at least on the shortest data transfer path 174 for each data element 152 that is determined similar to that described in FIGS. 1 and 2.

At 426, the processing engine 144 communicates the first subset of data elements 152 using a first data transfer path 174 through the first subset of devices 120, similar to that described in FIG. 2. The first data transfer path 174 may correspond to the shortest data transfer path 174 for the first subset of data elements 152 that is determined similar to that described in FIG. 2.

At 428, the processing engine 144 communicates the second subset of data elements 152 using a second data transfer path 174 through the second subset of devices 120, similar to that described in FIG. 2. The second data transfer path 174 may correspond to the shortest data transfer path 174 for the second subset of data elements 152 that is determined similar to that described in FIG. 2.

Figure 5:
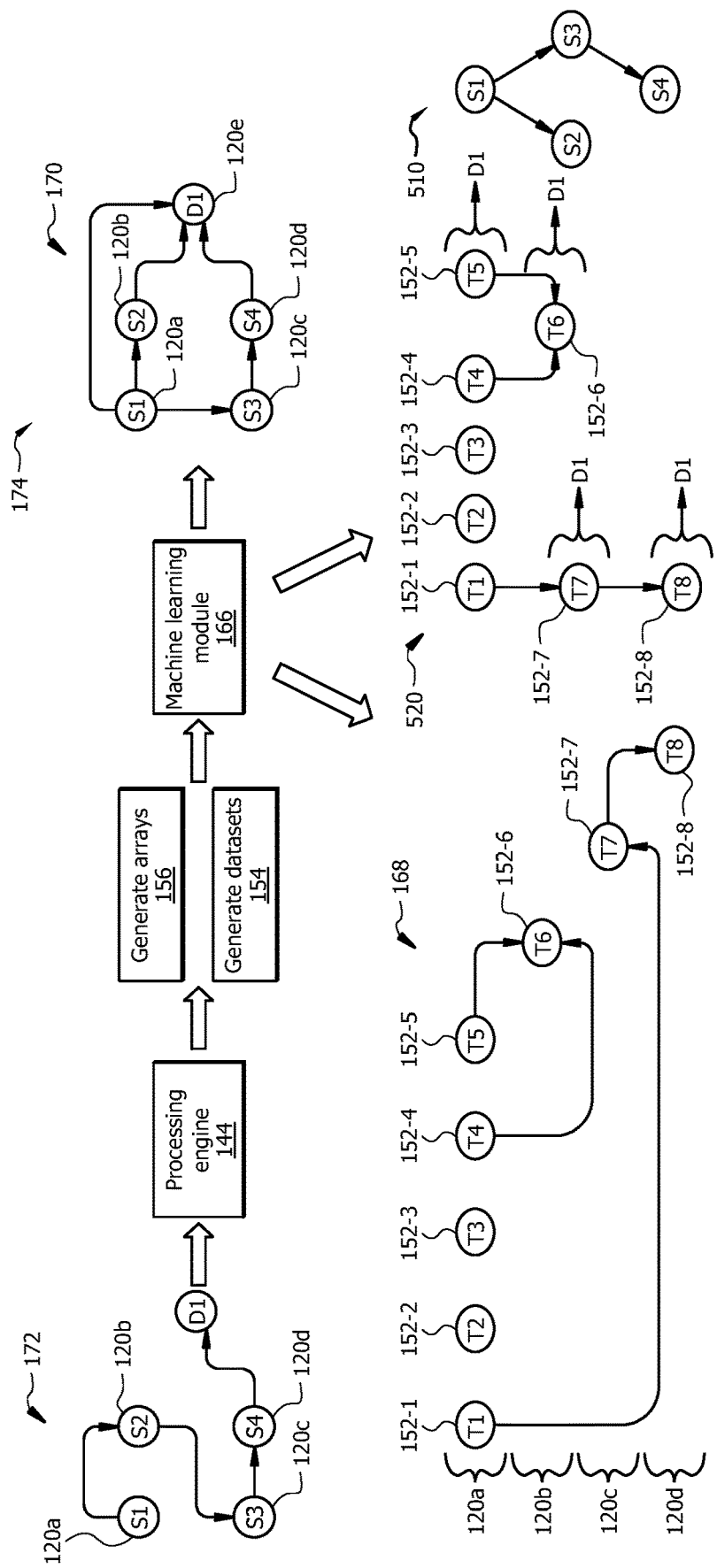
FIG. 5 illustrates an example use case for determining the shortest data transfer path for each data element.

An Example Use Case for Determining the Shortest Data Transfer Paths for Data Elements FIG. 5 illustrates an example operational flow 500 for determining the shortest data transfer paths 174 for data elements 152 in a particular use case. The operational flow 500 begins when the processing engine 144 accesses the set of devices 120, similar to that described in FIG. 2. The processing engine 144 determines historical and/or existing data transfer paths 172. The processing engine 144 determines the data elements 152 at each device 120. An example table illustrating the existing data transfer paths 172 for data elements 152 is shown in Table 1. Each data element 152 and/or dataset 154 may be associated with a key (e.g., an identifier or a flag) that is used to identify the data element 152 and/or dataset 154.

TABLE 1

Example existing data transfer paths 172.

| Devices 120 | Data elements 152 | | | | | | |
|---|---|---|---|---|---|---|---|
| S1->S2 | 152-1 | 152-2 | 152-3 | 152-4 | 152-5 | | |
| S2->S3 | 152-1 | 152-2 | 152-3 | 152-4 | 152-5 | 152-6 | |
| S3->S4 | 152-1 | 152-2 | 152-3 | 152-4 | 152-5 | 152-6 | 152-7 |
| S4->D1 | 152-1 | 152-2 | 152-3 | 152-4 | 152-5 | 152-6 | 152-7 | 152-8 |

S1 represents device 120a, S2 represents device 120b, S3 represents device 120c, $S_4$ represents device 120d, and D1 represents destination device 120e. As shown in Table 1, data elements 152-1 to 152-5 are transmitted from device 120a to device 120b, data elements 152-1 to 152-6 are transmitted from device 120b to device 120c, data elements 152-1 to 152-7 are transmitted from device 120c to device 120d, and data elements 152-1 to 152-8 are transmitted from device 120d to device 120e. The processing engine 144 uses this information to generate array 156 and datasets 154, similar to that described in FIG. 2. Table 2 illustrates example arrays 156 and datasets 154 for the data elements 152 at each device 120a to 120d.

TABLE 2

Example arrays 156 and datasets 154 for the data elements 152.

| Devices 120 | Arrays 156 | | | | | | | |
|---|---|---|---|---|---|---|---|---|
| S1 | T(152-1, nil, y, S1) | T(152-2, nil, y, S1) | T(152-3, nil, y, S1) | T(152-4, nil, y, S1) | T(152-5, nil, y, S1) | | | |
| S2 | T(152-1, nil, y, S2) | T(152-2, nil, y, S2) | T(152-3, nil, y, S2) | T(152-4, nil, y, S2) | T(152-5, nil, y, S2) | T(152-6, t(152-4, 152-5), y, S2) | | |
| S3 | T(152-1, nil, y, S3) | T(152-2, nil, y, S3) | T(152-3, nil, y, S3) | T(152-4, nil, y, S3) | T(152-5, nil, y, S3) | T(152-6, nil, y, S3) | T(152-7, t(152-1), y, S3) | |
| S4 | T(152-1, nil, y, S4) | T(152-2, nil, y, S4) | T(152-3, nil, y, S4) | T(152-4, nil, y, S4) | T(152-5, nil, y, S4) | T(152-6, nil, y, S4) | T(152-7, nil, y, S4) | T(152-8, t(152-7), y, S4) |

Each row in Table 2 may correspond to a dataset 154 of data elements 152 at each device 120. T (152-1, nil, y, S1) corresponds to an array 156 representing data element 152-1 at device 120a (noted at S1). In this array 156, 152-1 represents the data element name 158, nil represents that no transformation type 160 is implemented on this data element 152, y represents data type 162, and S1 represents device name 164 of the device 120a. Similarly, other arrays 156 represent the other data elements 152. For example, nil in any array 156 represents that no transformation type 160 is implemented. Generally, each array 156 for each data element 152 is represented by T (data element name 158, transformation type 160, data type 162, and device name 164).

T (152-6, t (152-4, 152-5), y, S2) corresponds to an array 156 that represents data element 152-6 at device 120b (noted as S2). In this array 156, 152-6 represents the data element name 158, t (152-4, 152-5) represents a transformation type 160 implemented on data elements 152-4 and 154-5 that produces the data element 152-6, y represents data type 162, and S2 represents device name 164 of the device 120b. This transformation type 160 occurs at device 120b.

T (152-7, t (152-1), y, S3) corresponds to an array 156 that represents data element 152-7 at device 120c (noted as S3). In this array 156, 152-7 represents the data element name 158, t (152-1) represents a transformation type 160 implemented on data elements 152-1 that produces the data element 152-7, y represents data type 162, and S3 represents device name 164 of the device 120c. This transformation type 160 occurs at device 120c.

T (152-8, t (152-7), y, S4) corresponds to an array 156 that represents data element 152-8 at device 120d (noted as S4). In this array 156, 152-8 represents the data element name 158, t (152-7) represents a transformation type 160 implemented on data elements 152-7 that produces the data element 152-8, y represents data type 162, and S3 represents device name 164 of the device 120d. This transformation type 160 occurs at device 120d.

The processing engine 144 feeds this information to the machine learning module 166. The machine learning module 166 analyzes this information and determines which data element(s) 152 are transformed at which device(s) 120 and which data element(s) 152 are not transformed at which device(s) 120. For example, the machine learning module 166 determines data elements 152 that are transformed and not transformed at device 120a and 120b, similar to that shown in Table 3.

TABLE 3

Example data elements transformations.

| | Arrays 156 | | | | |
|---|---|---|---|---|---|
| S2 ∩ S1 | T(152-1, nil, y, S1) | T(152-2, nil, y, S1) | T(152-3, nil, y, S1) | T(152-4, nil, y, S1) | T(152-5, nil, y, S1) |
| S2−S1 | T(152-6, t(152-4, 152-5), y, S2) | | | | |

S2 ∩S1 represents data elements 152 that are not transformed at S1 (i.e., device 120a). In other words, S2 ∩S1 represents an intersection of data elements 152 between device 120a and 120b. S2−S1 represents data element 152 that is transformed and/or generated at S2 (i.e., device 120b). In other words, S2−S1 may represent data elements 152 in device 120b but not in device 120a. Similarly, the machine learning module 166 determines data elements 152 that are transformed at devices 120b and 120c, similar to that shown in Table 4.

TABLE 4

Example data elements transformations.

| | Arrays 156 | | | | |
|---|---|---|---|---|---|
| S3 ∩ S2 | T(152-1, nil, y, S2) | T(152-2, nil, y, S2) | T(152-3, nil, y, S2) | T(152-4, nil, y, S2) | T(152-5, nil, y, S2) | T(152-6, nil, y, S2) |
| S3 ∩ S2 ∩ S1 | T(152-1, nil, y, S1) | T(152-2, nil, y, S1) | T(152-3, nil, y, S1) | T(152-4, nil, y, S1) | T(152-5, nil, y, S1) | |
| S3−S2 | T(152-7, t( 152-1), y, S3) | | | | | |

S3 ∩S2 represents data elements 152 that are not transformed at S2 (i.e., device 120b). In other words, S3 ∩S2 represent an intersection of data elements 152 between device 120b and 120c. S3 ∩S2 ∩S1 represents data elements 152 that are not transformed at S1 (i.e., device 120b). S3−S2 represents data elements 152 that are transformed and/or generated at S3 (i.e., device 120c). In other words, S3 ∩S2 ∩S1 represent an intersection of data elements 152 between device 120b to 120c. S3−S2 represents data element 152 that is transformed and/or generated at S3 (i.e., device 120c). In other words, S3−S2 may represent data elements 152 in device 120c but not in device 120b. Similarly, the machine learning module 166 determines data elements 152 that are transformed at devices 120b to 120d, similar to that shown in Table 5.

TABLE 5

Example data elements transformations.

| | Arrays 156 | | | | | | |
|---|---|---|---|---|---|---|---|
| S4 ∩ S3 | T(152-1, nil, y, S3) | T(152-2, nil, y, S3) | T(152-3, nil, y, S3) | T(152-4, nil, y, S3) | T(152-5, nil, y, S3) | T(152-6, nil, y, S3) | T(152-7, nil, y, S3) |
| S4 ∩ S3 ∩ S2 | T(152-1, nil, y, S2) | T(152-2, nil, y, S2) | T(152-3, nil, y, S2) | T(152-4, nil, y, S2) | T(152-5, nil, y, S2) | T(152-6, nil, y, S2) | |
| S4 ∩ S3 ∩ S2 ∩ S1 | T(152-1, nil, y, S1) | T(152-2, nil, y, S1) | T(152-3, nil, y, S1) | T(152-4, nil, y, S1) | T(152-5, nil, y, S1) | | |
| S4−S3 | T(152-8, t(152-7), y, S4) | | | | | | |

S4 ∩S3 represents data elements 152 that are not transformed at S3 (i.e., device 120c). In other words, S4 ∩S3 represents an intersection of data elements 152 between device 120c and 120d. S4 ∩S3 ∩S2 represents data elements 152 that are not transformed at S2 (i.e., device 120b). In other words, S4 ∩S3 ∩S2 represents an intersection of data elements 152 between device 120b to 120d. S4 ∩S3 ∩S2∩S1 represents data elements 152 that are not transformed at 51 (i.e., device 120a). In other words, S4 ∩S3 ∩S2 n S1 represents an intersection of data elements 152 between device 120a to 120d. S4-S3 represents a data element 152 that is transformed and/or generated at S4 (i.e., device 120d). In other words, S4-S3 may represent data elements 152 in device 120d but not in device 120c. Based on the information in Tables 3 to 5, the processing engine 144 (e.g., via the machine learning module 166) determines the dependencies between the devices 120a to 120d, similar to that shown in Table 6.

TABLE 6 device dependencies dataflow.

| Devices 120 | Arrays 156 | | | |
|---|---|---|---|---|
| S1 | T(152-1, nil, y, S1) | T(152-2, nil, y, S1) | T(152-3, nil, y, S1) | T(152-4, nil, y, S1) | T(152-5, nil, y, S1) |
| S1 <- S2 | T(152-4, nil, y, S2) | T(152-5, nil, y, S2) | | |
| S1 <- S3 | T(152-1, nil, y, S1) | | | |
| S3 <- S4 | T(152-7, nil, y, S3) | | | |

As can be seen in Table 6, S1 (i.e., device 120a) is not dependent on any other devices 120, S2 (i.e., device 120b) depends on S1 (i.e., device 120a), S3 (i.e., device 120c) depends on S1 (i.e., device 120a), and S4 (i.e., device 120d) depends on S3 (i.e., device 120c). The data elements 152 that depend on particular devices 120 are shown in Table 6. Based on this information, the processing engine 144 determines the transformation tree 510. The transformation tree 510 represents dependencies between devices 120a to 120d. The transformation tree 510 is a graphical representation of Table 6.

The processing engine 144 determines the transformation dependency map 168, dependency tree 520, and device dependency map 170, similar to that described in FIG. 2. For example, the transformation dependency map 168 represents which data elements 152 are transformed at which devices 120 and which data elements 152 are not transformed at which devices 120.

In the illustrated example, the data element 152-7 (generated at device 120c) depends on data element 152-1, data element 152-6 (generated at device 120b) depends on data elements 152-4 and 152-5, and data element 152-8 (generated at device 120d) depends on data element 152-7. The dependency tree 520 may correspond to another illustration of the transformation dependency map 168.

Analyzing the dependency tree 520 vertically and horizontally may provide meaning full information. The data elements 152 at each row of the dependency tree 520 may be directly communicated to the destination device 120e.

For example, the top row of the dependency tree 520 includes data elements 152-1 to 152-5. These data elements 152 may be directly communicated to the destination device 120e from the source device 120a. In another example, the middle row of the dependency tree 520 includes data elements 152-6 and 152-7. The data element 152-6 can be communicated to the destination device 120e directly from the device 120b. The data element 152-7 can be communicated to the destination device 120e directly from the device 120c. In another example, the bottom row of the dependency tree 520 includes data element 152-8 which can be communicated to the destination device 120e directly from the device 120d. These communications are based on the shortest data transfer path 174 for each data element 152. The processing engine 144 determines the device dependency map 170 and the data transfer paths 174, similar to that described in FIG. 2.

As can be seen from the device dependency map 170, a first subset of data elements 152 is communicated from the device 120a to device 120e using a first transfer path 174, a second subset of data elements 152 is communicated from the device 120a to device 120e via device 120b. using a second transfer path 174, and a third subset of data elements 152 is communicated from the device 120a to device 120e via the devices 120c and 120d using a third transfer path 174. These subsets of data elements 152 may be split using the method 400 described in FIG. 4. These data transfer paths 174 correspond to the shortest data transfer path 174 determined for each subset of data elements 152, similar to that described in FIG. 2. The data transfer paths 174 for the data elements 152 are shown in Table 7.

TABLE 7

Example data transfer paths for data elements.

| Devices 120 | Data elements 152 | | | | | |
|---|---|---|---|---|---|---|
| S1->D1 | 152-1 | 152-2 | 152-3 | 152-4 | 152-5 | |
| S1->S2 | | | | 152-4 | 152-5 | |
| S2->D1 | | | | | 152-6 | |
| S1->S3 | | | 152-3 | 152-4 | 152-5 | |
| S3->S4 | | | 152-3 | 152-4 | 152-5 | 152-7 |
| S4->D1 | | | | | | 152-7 | 152-8 |

S1 represents device 120a, S2 represents device 120b, S3 represents device 120c, S4 represents device 120d, and D1 represents destination device 120e. The data elements 152-1 to 152-5 are communicated from S1 to D1, data element 152-6 is communicated from S2 to D1, and data elements 152-4 and 152-5 are communicated from S4 to D1. These transfer paths 174 correspond to the shortest data transfer path 174 for each data element 152, and other data transfer paths 174 are ignored.

Figure 6:
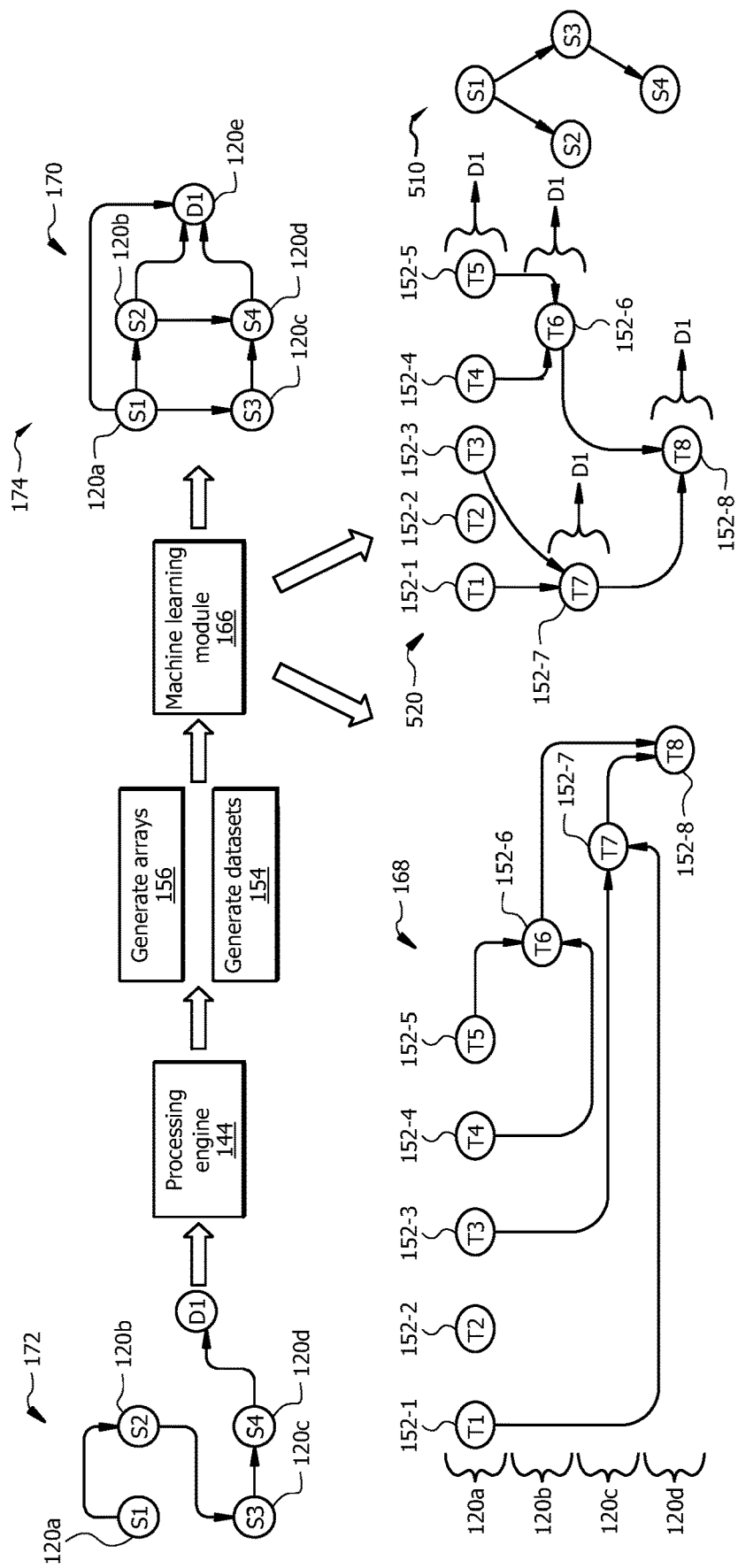
FIG. 6 illustrates an example use case for determining the shortest data transfer path for each data element.

An Example Use Case for Determining the Shortest Data Transfer Paths for Data Elements FIG. 6 illustrates an example operational flow 600 for determining the shortest data transfer paths 174 for data elements 152 in a particular use case. The operational flow 600 begins when the processing engine 144 accesses the set of devices 120, similar to that described in FIG. 2. The processing engine 144 determines historical and/or existing data transfer paths 172. The processing engine 144 determines the data elements 152 at each device 120. An example table illustrating the existing data transfer paths 172 for data elements 152 is shown in Table 8. Each data element 152 and/or dataset 154 may be associated with a key (e.g., an identifier or a flag) that is used to identify the data element 152 and/or dataset 154.

TABLE 8

Example existing data transfer paths 172.

| Devices 120 | Data elements 152 | | | | | | |
|---|---|---|---|---|---|---|---|
| S1->S2 | 152-1 | 152-2 | 152-3 | 152-4 | 152-5 | | |
| S2->S3 | 152-1 | 152-2 | 152-3 | 152-4 | 152-5 | 152-6 | |
| S3->S4 | 152-1 | 152-2 | 152-3 | 152-4 | 152-5 | 152-6 | 152-7 |
| S4->D1 | 152-1 | 152-2 | 152-3 | 152-4 | 152-5 | 152-6 | 152-7 | 152-8 |

Table 8 may correspond to Table 1 described above in FIG. 5. The following Tables 9 to 14 support the operational flow 600 for this particular use case.

TABLE 9

Example arrays 156 and datasets 154 for the data elements 152.

| Devices 120 | Arrays 156 | | | | | | | |
|---|---|---|---|---|---|---|---|---|
| S1 | T(152-1, nil, y, S1) | T(152-2, nil, y, S1) | T(152-3, nil, y, S1) | T(152-4, nil, y, S1) | T(152-5, nil, y, S1) | | | |
| S2 | T(152-1, nil, y, S2) | T(152-2, nil, y, S2) | T(152-3, nil, y, S2) | T(152-4, nil, y, S2) | T(152-5, nil, y, S2) | T(152-6, t(152-4, 152-5), y, S2) | | |
| S3 | T(152-1, nil, y, S3) | T(152-2, nil, y, S3) | T(152-3, nil, y, S3) | T(152-4, nil, y, S3) | T(152-5, nil, y, S3) | T(152-6, nil, y, S3) | T(152-7, t(152-1, 152-3), y, S3) | |
| S4 | T(152-1, nil, y, S4) | T(152-2, nil, y, S4) | T(152-3, nil, y, S4) | T(152-4, nil, y, S4) | T(152-5, nil, y, S4) | T(152-6, nil, y, S4) | T(152-7, nil, y, S4) | T(152-8, t(152-7, 152-6), y, S4) |

The processing engine 144 feeds this information to the machine learning module 166. The machine learning module 166 analyzes this information and determines which data element(s) 152 are transformed at which device(s) 120 and which data element(s) 152 are not transformed at which device(s) 120. For example, the machine learning module 166 determines data elements 152 that are transformed and not transformed at devices 120a and 120b, similar to that shown in Table 10.

TABLE 10

Example data elements transformations

| | Arrays 156 | | | | |
|---|---|---|---|---|---|
| S2 ∩ S1 | T(152-1, nil, y, S1) | T(152-2, nil, y, S1) | T(152-3, nil, y, S1) | T(152-4, nil, y, S1) | T(152-5, nil, y, S1) |
| S2-S1 | T(152-6, t(152-4, 152-5), y, S2) | | | | |

Similarly, the machine learning module 166 determines data elements 152 that are transformed at devices 120b and 120c, similar to that shown in Table 11.

TABLE 11

Example data elements transformations.

| | Arrays 156 | | | | | |
|---|---|---|---|---|---|---|
| S3 ∩ S2 | T(152-1, nil, y, S2) | T(152-2, nil, y, S2) | T(152-3, nil, y, S2) | T(152-4, nil, y, S2) | T(152-5, nil, y, S2) | T(152-6, nil, y, S2) |

TABLE 11-continued

Example data elements transformations.

| | Arrays 156 | | | | |
|---|---|---|---|---|---|
| S3 ∩ S2 ∩ S1 | T(152-1, nil, y, S1) | T(152-2, nil, y, S1) | T(152-3, nil, y, S1) | T(152-4, nil, y, S1) | T(152-5, nil, y, S1) |
| S3-S2 | T(152-7, t(152-1, 152-3), y, S3) | | | | |

Similarly, the machine learning module 166 determines data elements 152 that are transformed at devices 120b to 120d, similar to that shown in Table 12.

TABLE 12

Example data elements transformations.

| | Arrays 156 | | | | | | |
|---|---|---|---|---|---|---|---|
| S4 ∩ S3 | T(152-1, nil, y, S3) | T(152-2, nil, y, S3) | T(152-3, nil, y, S3) | T(152-4, nil, y, S3) | T(152-5, nil, y, S3) | T(152-6, nil, y, S3) | T(152-7, nil, y, S3) |
| S4 ∩ S3 ∩ S2 | T(152-1, nil, y, S2) | T(152-2, nil, y, S2) | T(152-3, nil, y, S2) | T(152-4, nil, y, S2) | T(152-5, nil, y, S2) | T(152-6, nil, y, S2) | |
| S4 ∩ S3 ∩ S2 ∩ S1 | T(152-1, nil, y, S1) | T(152-2, nil, y, S1) | T(152-3, nil, y, S1) | T(152-4, nil, y, S1) | T(152-5, nil, y, S1) | | |
| S4-S3 | T(152-8, t(152-7, 152-6), y, S4) | | | | | | |

Based on the information in Tables 10 to 12, the processing engine 144 (e.g., via the machine learning module 166) determines the dependencies between the devices 120a to 120d, similar to that shown in Table 13.

TABLE 13 device dependencies dataflow.

| Devices 120 | Arrays 156 | | | | |
|---|---|---|---|---|---|
| S1 | T(152-1, nil, y, S1) | T(152-2, nil, y, S1) | T(152-3, nil, y, S1) | T(152-4, nil, y, S1) | T(152-5, nil, y, S1) |
| S1 <- S2 | T(152-4, nil, y, S2) | | T(152-5, nil, y, S2) | | |
| S1 <- S3 | T(152-1, nil, y, S1) | | T(152-3, nil, y, S1) | | |
| S3 <- S4 | T(152-7, nil, y, S3) | | T(152-7, nil, y, S3) | | |

Based on this information, the processing engine 144 determines the transformation tree 510. The transformation tree 510 represents dependencies between devices 120a to 120d. The transformation tree 510 is a graphical representation of Table 13. The processing engine 144 determines the transformation dependency map 168, dependency tree 520, and device dependency map 170, similar to that described in FIG. 2. For example, the transformation dependency map 168 represents which data elements 152 are transformed at which devices 120 and which data elements 152 are not transformed at which devices 120.

Analyzing the dependency tree 520 vertically and horizontally may provide meaning full information. The data elements 152 at each row of the dependency tree 520 may be directly communicated to the destination device 120e.

The data elements 152-1 to 152-5 can be communicated directly to the destination device 120e (i.e., DO from the source device 120a. The data element 152-6 can be communicated to the destination device 120e directly from the device 120b. The data element 152-7 can be communicated to the destination device 120e directly from the device 120c. The data element 152- The data element 152-8 can be communicated to the destination device 120e directly from the device 120d. These communications are based on the shortest data transfer path 174 for each data element 152.

The processing engine 144 determines the device dependency map 170 and the data transfer paths 174, similar to that described in FIG. 2.

The device dependency map 170 illustrates the shortest data transfer paths 174 of the data elements 152 based on the operational flow 600. These data elements 152 may be split using the method 400 described in FIG. 4. These data transfer paths 174 correspond to the shortest data transfer path 174 determined for each subset of data elements 152, similar to that described in FIGS. 2 and 5. The data transfer paths 174 for the data elements 152 are shown in Table 14.

TABLE 14

Example data transfer paths for data elements.

| Devices 120 | Data elements 152 | | | | | | |
|---|---|---|---|---|---|---|---|
| S1->S2 | | | | 152-4 | 152-5 | | |
| S1->S3 | 152-1 | | 152-3 | | | | |
| S2->S4 | | | | | | 152-6 | |
| S3->S4 | | | | | | | 152-7 |
| S1->D1 | 152-1 | 152-2 | 152-3 | 152-4 | 152-5 | | |
| S2->D1 | | | | | | 152-6 | |
| S3->D1 | | | | | | | 152-7 |
| S4->D1 | | | | | | | 152-8 |

The data elements 152-1 to 152-5 can be communicated directly from 51 to D1, the data element 152-6 can be communicated directly from S2 to D1, the data element 152-7 can be communicated directly from S3 to D1, and the data element 152-8 can be communicated directly from S4 to D1. These transfer paths 174 correspond to the shortest data transfer path 174 for each data element 152.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U. S.C. § 112(f) as it exists on the date of filing hereof unless the words "means for" or "step for" are explicitly used in the particular claim.

The invention claimed is:

1. A system for communicating data elements using the shortest data transfer path among devices, comprising:
   a memory configured to store one or more data elements;
   a processor, operably coupled with the memory, and configured to:
      access a set of devices transferring the one or more data elements from a source device to a destination device;
      for a data element from among the one or more data elements at a given device from among the set of devices:
         determine a transformation type implemented on the data element, wherein the transformation type represents a type of change made to the data element; and
         generate an array that uniquely defines the data element, wherein the array comprises the transformation type and an identifier of the given device;
      generate a transformation dependency map that represents a set of transformation types implemented on the data element at different devices from among the set of devices;
      determine a set of data transfer paths for the data element from the source device to the destination device based at least in part upon the transformation dependency map, wherein each of the set of data transfer paths has a different number of hops between the set of devices;
      select the shortest data transfer path from among the set of data transfer paths for the data element from the source device to the destination device that corresponds to the least number of hops between devices; and
      communicate the data element from the source device to the destination device using the shortest data transfer path.

2. The system of claim 1, wherein:
   the processor is further configured to determine a device dependency map that represents dependencies among the set of devices; and
   determining the set of data transfer paths for the data element from the source device to the destination device is further based at least in part upon the device dependency map.

3. The system of claim 1, wherein:
   the array further comprises a name of the data element and a data type associated with the data element; and
   the data type associated with the data element comprises a number, a character, a character string, a composite type, or any combination thereof.

4. The system of claim 1, wherein the processor is further configured to:
   determine that the data element is passed through a particular device from among the set of devices without being transformed using the transformation type; and
   remove the particular device from the set of data transfer paths for the data element from the source device to the destination device.

5. The system of claim 1, wherein the transformation type implemented on the data element comprises a normalization operation or a duplicated data removal operation.

6. The system of claim 1, wherein:
   the processor is further configured to identify a set of historical data transfer paths for the data element from the source device to the destination device; and
   determining the set of data transfer paths is further based at least in part upon the set of historical data transfer paths.

7. The system of claim 1, wherein, in response to determining that two data transfer paths for the data element have the least number of hops for the data element from the source device to the destination device, the processor is further configured to identify a particular data transfer path from among the two data transfer paths based at least in part upon a predefined rule, wherein the predefined rule indicates selecting a data transfer path that maximizes data security and data quality.

8. A method for communicating data elements using the shortest data transfer path among devices, comprising:
   accessing a set of devices transferring one or more data elements from a source device to a destination device;
   for a data element from among the one or more data elements at a given device from among the set of devices:
      determining a transformation type implemented on the data element, wherein the transformation type represents a type of change made to the data element; and
      generating an array that uniquely defines the data element, wherein the array comprises the transformation type and an identifier of the given device;
   generating a transformation dependency map that represents a set of transformation types implemented on the data element at different devices from among the set of devices;
   determining a set of data transfer paths for the data element from the source device to the destination device based at least in part upon the transformation dependency map, wherein each of the set of data transfer paths has a different number of hops between the set of devices;
   selecting the shortest data transfer path from among the set of data transfer paths for the data element from the source device to the destination device that corresponds to the least number of hops between devices; and communicating the data element from the source device to the destination device using the shortest data transfer path.

9. The method of claim 8, further comprising:
determining a device dependency map that represents dependencies among the set of devices; and
determining the set of data transfer paths for the data element from the source device to the destination device is further based at least in part upon the device dependency map.

10. The method of claim 8, wherein:
the array further comprises a name of the data element and a data type associated with the data element; and
the data type associated with the data element comprises a number, a character, a character string, a composite type, or any combination thereof.

11. The method of claim 8, further comprising:
determining that the data element is passed through a particular device from among the set of devices without being transformed using the transformation type; and
removing the particular device from the set of data transfer paths for the data element from the source device to the destination device.

12. The method of claim 8, wherein the transformation type implemented on the data element comprises a normalization operation or a duplicated data removal operation.

13. The method of claim 8, further comprising:
identifying a set of historical data transfer paths for the data element from the source device to the destination device; and
determining the set of data transfer paths is further based at least in part upon the set of historical data transfer paths.

14. The method of claim 8, further comprising, in response to determining that two data transfer paths for the data element have the least number of hops for the data element from the source device to the destination device, identifying a particular data transfer path from among the two data transfer paths based at least in part upon a predefined rule, wherein the predefined rule indicates selecting a data transfer path that maximizes data security and data quality.

15. A computer program comprising executable instructions stored in a non-transitory computer-readable medium that when executed by a processor causes the processor to:
access a set of devices transferring one or more data elements from a source device to a destination device;
for a data element from among the one or more data elements at a given device from among the set of devices:
determine a transformation type implemented on the data element, wherein the transformation type represents a type of change made to the data element; and
generate an array that uniquely defines the data element, wherein the array comprises the transformation type and an identifier of the given device;
generate a transformation dependency map that represents a set of transformation types implemented on the data element at different devices from among the set of devices;
determine a set of data transfer paths for the data element from the source device to the destination device based at least in part upon the transformation dependency map, wherein each of the set of data transfer paths has a different number of hops between the set of devices;
select the shortest data transfer path from among the set of data transfer paths for the data element from the source device to the destination device that corresponds to the least number of hops between devices; and
communicate the data element from the source device to the destination device using the shortest data transfer path.

16. The computer program of claim 15, wherein:
the instructions when executed by the processor, further cause the processor to determine a device dependency map that represents dependencies among the set of devices; and
determining the set of data transfer paths for the data element from the source device to the destination device is further based at least in part upon the device dependency map.

17. The computer program of claim 15, wherein:
the array further comprises a name of the data element and a data type associated with the data element; and
the data type associated with the data element comprises a number, a character, a character string, a composite type, or any combination thereof.

18. The computer program of claim 15, wherein the instructions when executed by the processor, further cause the processor to:
determine that the data element is passed through a particular device from among the set of devices without being transformed using the transformation type; and
remove the particular device from the set of data transfer paths for the data element from the source device to the destination device.

19. The computer program of claim 15, wherein the transformation type implemented on the data element comprises a normalization operation or a duplicated data removal operation.

20. The computer program of claim 15, wherein:
the instructions when executed by the processor, further cause the processor to identify a set of historical data transfer paths for the data element from the source device to the destination device; and
determining the set of data transfer paths is further based at least in part upon the set of historical data transfer paths.

* * * * *